United States Patent
Wang (10) Patent No.: US 10,689,909 B2
(45) Date of Patent: Jun. 23, 2020

(54) LIGHTWEIGHT ELECTRIC EARTH DRILL

(71) Applicant: INTRADIN (SHANGHAI) MACHINERY CO., LTD., Shanghai (CN)

(72) Inventor: Junliang Wang, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 0 days.

(21) Appl. No.: 16/236,317

(22) Filed: Dec. 28, 2018

(65) Prior Publication Data

US 2019/0195019 A1   Jun. 27, 2019

Related U.S. Application Data

(63) Continuation of application No. PCT/CN2018/072406, filed on Jan. 12, 2018.

(30) Foreign Application Priority Data

Dec. 21, 2017 (CN) .................. 2017 2 1799604 U (51) Int. Cl.
  *E21B 3/02* (2006.01)
  *E21B 7/02* (2006.01)
  *E21B 7/04* (2006.01)

(52) U.S. Cl.
  CPC ............ *E21B 3/02* (2013.01); *E21B 7/027* (2013.01); *E21B 7/028* (2013.01); *E21B 7/04* (2013.01)

(58) Field of Classification Search
  CPC . E21B 3/02; E21B 7/005; E21B 7/008; E21B 7/027; E21B 7/04; E21B 7/028; E21B 10/44
  (Continued)

(56) References Cited

U.S. PATENT DOCUMENTS 2,320,612 A * 6/1943 Kandle .................. E21B 10/44
                                                       175/170
2,401,250 A * 5/1946 Kandle .................. E21B 10/44
                                                       175/242

(Continued)

FOREIGN PATENT DOCUMENTS

| CN | 203633096 U | 6/2014 |
|----|----|----|
| CN | 207148102 U | 3/2018 |
| CN | 207431328 U | 6/2018 |

*Primary Examiner* — Michael R Wills, III
(74) *Attorney, Agent, or Firm* — Wayne & Ken, LLC; Tony Hom (57) ABSTRACT

Disclosed is a lightweight electric earth drill including a mounting plate, a drill stem and an outer shell, a motor installed on the mounting plate and configured to drive the drill stem to rotate, a rechargeable battery configured to power the motor, and a controller configured to control the motor and electrically connected to the motor and the rechargeable battery. The lightweight electric earth drill is driven by the motor and has low noise, which causes less damage to health of the workers and does not disturb the residents around the construction site. The lightweight electric earth drill is powered by rechargeable battery or mains electricity without exhaust emission. The motor is controlled by the controller and rotates forwardly and reversely, enabling the drill bit to be pulled out after drilling the earth.

7 Claims, 7 Drawing Sheets

(58) Field of Classification Search
USPC .......................................................... 175/18
See application file for complete search history.

(56) References Cited

U.S. PATENT DOCUMENTS

| | | | | |
|---|---|---|---|---|
| 3,756,330 | A * | 9/1973 | Russell, Jr. | E21B 7/005 173/44 |
| 4,484,642 | A * | 11/1984 | Evans | E21B 17/22 175/323 |
| 5,330,014 | A * | 7/1994 | Wagner | A01K 97/01 173/29 |
| 5,476,149 | A * | 12/1995 | Rickards | E21B 10/44 175/388 |
| 5,673,761 | A * | 10/1997 | Berner | B25F 5/02 175/18 |
| 6,076,617 | A * | 6/2000 | Berner | E21B 7/005 175/18 |
| 9,270,152 | B2 * | 2/2016 | Schamberger | H02K 7/145 |
| 2013/0014996 | A1 * | 1/2013 | Ruppel | E21B 7/005 175/170 |
| 2013/0058711 | A1 * | 3/2013 | Van Der Linde | H01R 13/72 403/349 |
| 2016/0230469 | A1 * | 8/2016 | Frost | E21B 10/44 |

* cited by examiner

LIGHTWEIGHT ELECTRIC EARTH DRILL

CROSS-REFERENCE TO RELATED APPLICATIONS

This application is a continuation of International Patent Application No. PCT/CN2018/072406, filed on Jan. 12, 2018, which claims the benefit of priority from Chinese Application No. 201721799604.2, filed on Dec. 21, 2017. The contents of the aforementioned applications, including any intervening amendments thereto, are incorporated herein by reference in its entirety.

TECHNICAL FIELD

The present invention relates to earth drilling machinery, and more specifically to a lightweight electric earth drill.

BACKGROUND

Currently, most commercially available earth drills are large earth drills for large-scale projects. There are small earth drills using gasoline or diesel engines to drive vacuum pumps or using pneumatics to drive drill stems to rotate. For general small projects, the small earth drills are inconvenient to carry and occupy large construction spaces. Furthermore, their engines are noisy. Long-term operation has a great influence on the health and hearing of workers and on the residents' lives around the construction site. Complaints from the residents will affect the construction progress, and the exhaust gas will cause harm to the human body. Driven by the engines, the drill stems cannot rotate reversely, which are inconvenient to pull out after drilling the earth. Thus, additional transmission is required for reverse rotation, which increases the size and weight of the earth drill, costs and the burden of handling and operation. At the same time, the existing earth drills have no structure for passing water, the drill stems are difficult to rotate when drilling the hard rocks. Thus, the earth drills can only drill the earth in a dry manner, or are added with water-passing devices.

SUMMARY

In view of the above problems, the present invention provides a lightweight electric earth drill to solve the problems of loud noise, environmental pollution, no forward/reverse rotation and lack of structure for passing water.

The lightweight electric earth drill includes a mounting plate, a drill stem, an outer shell, a motor installed on the mounting plate and configured to drive the drill stem to rotate, a rechargeable battery configured to power the motor, and a controller configured to control the motor and electrically connected to the motor and the rechargeable battery.

Further, the rechargeable battery is a lithium battery which is fixedly and detachably mounted on a top of the outer shell.

Further, the lithium battery is fixedly and detachably mounted on a left side or a right sides of the outer shell.

Further, two lithium batteries are provided, and the two lithium batteries are detachably mounted on the left and right sides of the outer shell, or detachably mounted on the top and the right sides of the outer shell, or detachably mounted on the top and the left side of the outer shell.

Further, three lithium batteries are provided, and the three lithium batteries are mounted on the top, the left and right sides of the outer shell.

Further, the outer shell is provided with a power interface connected to an external power supply. The power interface is electrically connected to the controller to power the motor and charge the rechargeable battery.

Further, the lightweight electric earth drill on both sides is provided with a handle, and the handle is fastened to the mounting plate.

Further, the handle is provided with a control button electrically connected to the controller, and the control button controls on/off and forward/reverse rotation of the motor.

Further, a lamp is electrically provided below the outer shell and connected to the controller, and the lamp illuminates along a direction of the drill stem.

Further, one end of the drill stem is engaged with an output shaft of the motor and a pin is inserted at a position where the drill stem is engaged with the output shaft.

Further, the drill stem is provided with double blades that continuously spiral up from a drill bit.

Further, the drill bit is sheathed on an earth-drilling end of the drill stem. A tip end of the drill bit is provided with a thread, and an end of the drill bit opposite to the tip end is provided with a cutting blade abutting against the double blades. Preferably, the cutting blade is of a tungsten steel material.

Further, a center hole for water passing is provided at centers of the output shaft and the drill stem, and a side hole is provided at the end of the drill stem close to the drill bit. The side hole communicates with the center hole.

The present invention has the following beneficial effects:

1. The lightweight electric earth drill is driven by the motor and has low noise, which causes less damage to health of workers and will not disturb residents around the construction site.

2. The lightweight electric earth drill is powered by the rechargeable battery or mains electricity without exhaust emission.

3. The motor of the lightweight electric earth drill is controlled by the controller and can rotate forwardly and reversely, enabling the drill bit to be pulled out after drilling the earth.

4. A center hole for passing water is provided at the centers of the output shaft and the drill stem, and a side hole is provided at the end of the drill stem close to the drill bit, so that the hard rock soil is moisturized to allow the rock soil to be drilled quickly and to reduce temperature of drill bit.

5. Since the lightweight electric earth drill is driven by the motor, it has a simpler and lighter structure, more convenient operation and less occupying space.

Reference numerals: 1, rechargeable battery; 2, outer shell; 21, upper shell; 22 lower shell; 3, controller; 4, motor; 41, output shaft; 5, mounting plate; 6, drill stem; 61, drill bit; 611, thread; 612, cutting blade; 62, double blade; 7, handle; 71, control button; 8, start switch; 9, pin; 10, center hole; 11, side hole; 12, power interface; 13, lamp; 14, water inlet.

DETAILED DESCRIPTION OF EMBODIMENTS

To make the technical problems, technical solutions and beneficial effects of the present invention clearer, the present invention will be further described in detail below with reference to the embodiments. It should be understood that the specific embodiments described herein are merely illustrative of, but not intended to limit the present invention, and terms such as "left", "right" used herein refer to the orientation or positional relationship shown in the drawings, which are merely illustrative of, but not intended to limit the present invention.

Referring to FIGS. 1-7, the present invention will be further described in detail with reference to the drawings.

Figure 1:
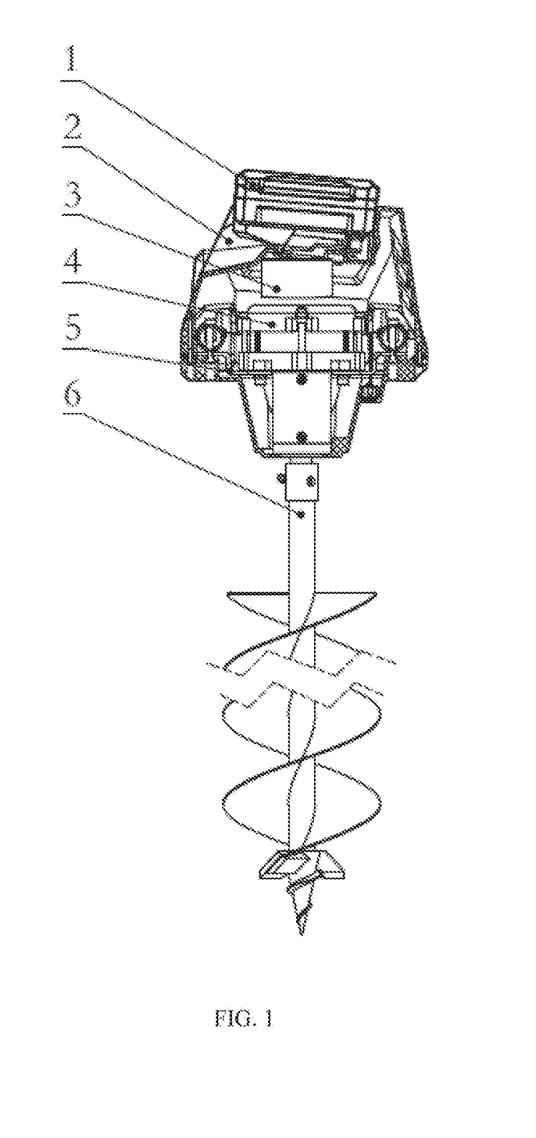
FIG. 1 is a schematic diagram of a lightweight electric earth drill according to an embodiment.
Figure 2:
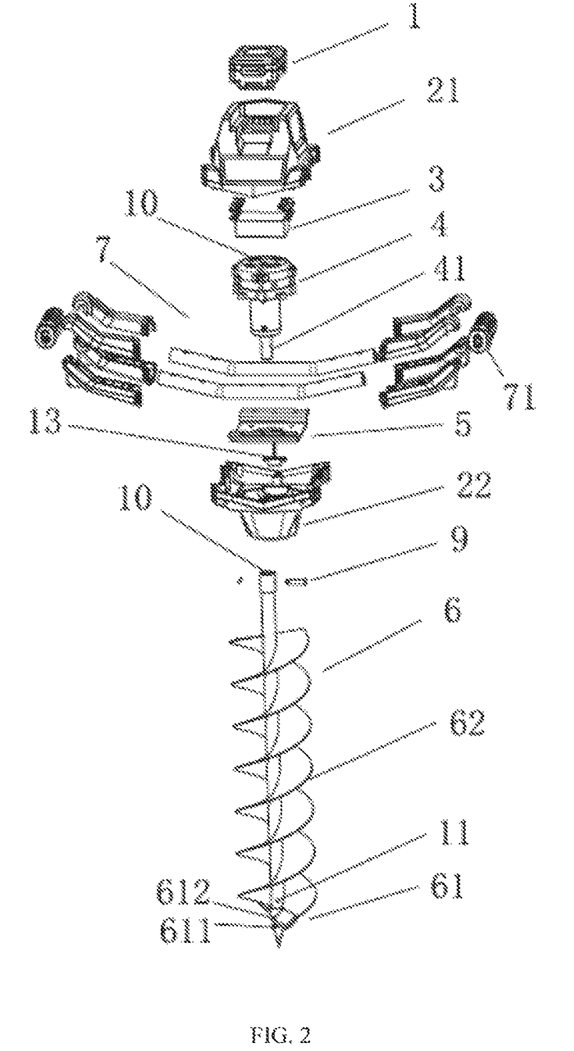
FIG. 2 is an exploded view of the lightweight electric earth drill according to an embodiment.
Figure 3:
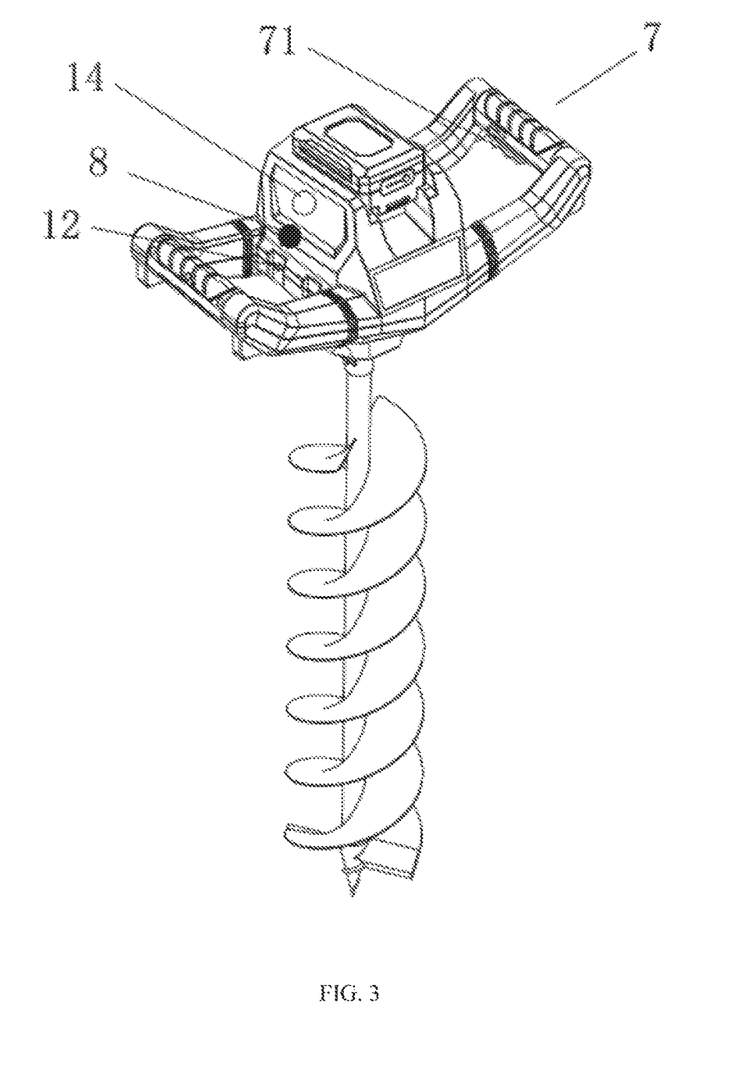
FIG. 3 is a perspective view of the lightweight electric earth drill according to the embodiment.

A lightweight electric earth drill includes a mounting plate 5, a drill stem 6, an outer shell 2 including an upper shell 21 and a lower shell 22, a motor 4 installed on the mounting plate 5 and configured to drive the drill stem 6 to rotate, a rechargeable battery 1 configured to power the motor 4, and a controller 3 configured to control the motor 4 and electrically connected to the motor 4 and the rechargeable battery 1. The mounting plate 5, the motor 4 and the controller 3 are installed in a space enclosed by the upper shell 21 and the lower shell 22. The lightweight electric earth drill on both sides is provided a handle 7, and the handle is fastened to the mounting plate 5. The handle 7 is provided with a control button 71 electrically connected to the controller 3, and the control button 71 controls on/off and forward/reverse rotation of the motor 4.

Figure 5:
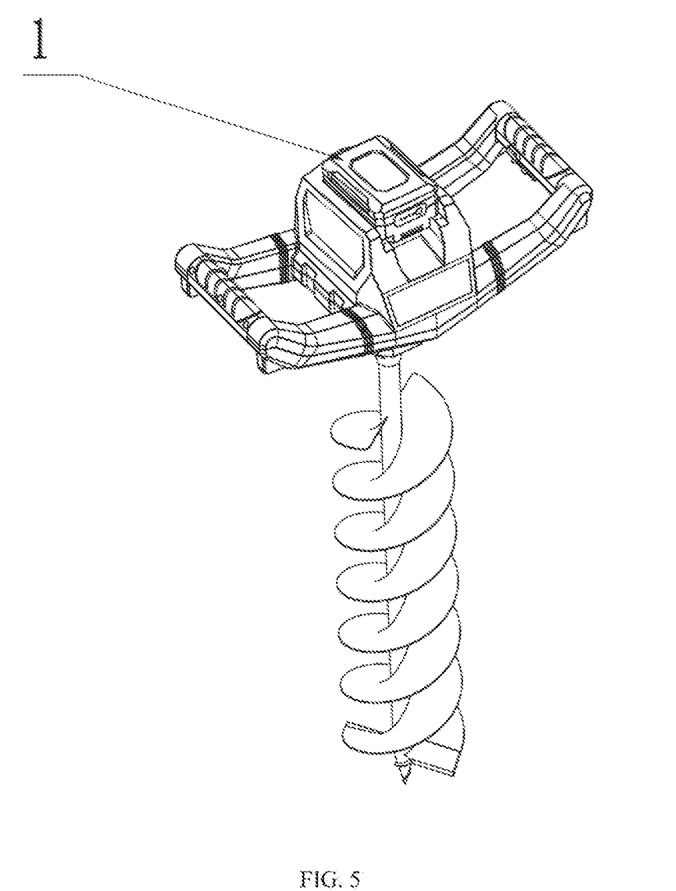
FIG. 5 is a perspective view of the lightweight electric earth drill (provided with one battery) according to the embodiment.

As shown in FIG. 5, the rechargeable battery 1 is a lithium battery which is fixedly and detachably mounted on a top of the outer shell 2.

Preferably, the rechargeable battery 1 is fixedly and detachably mounted on a left side or a right side of the outer shell 2.

Figure 6:
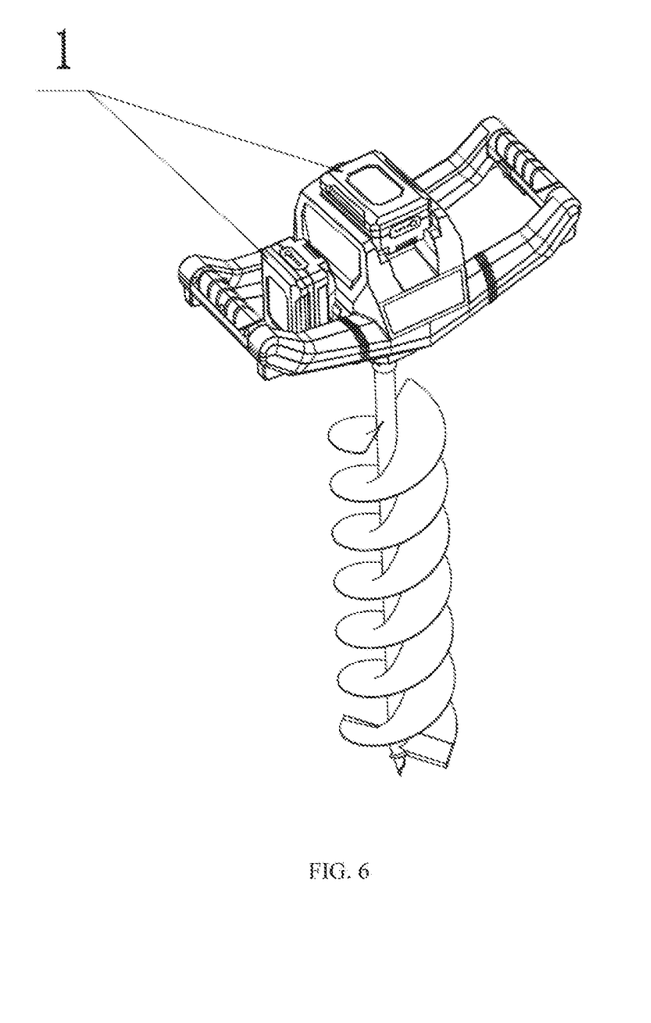
FIG. 6 is a perspective view of the lightweight electric earth drill (provided with two batteries) according to the embodiment.

As shown in FIG. 6, two rechargeable batteries 1 are provided, and the two rechargeable batteries 1 are detachably mounted on the top and the left side of the outer shell 2.

Preferably, the two rechargeable batteries 1 are detachably mounted on the left and right sides of the outer shell 2, or detachably mounted on the top and the right side of the outer shell 2.

Figure 7:
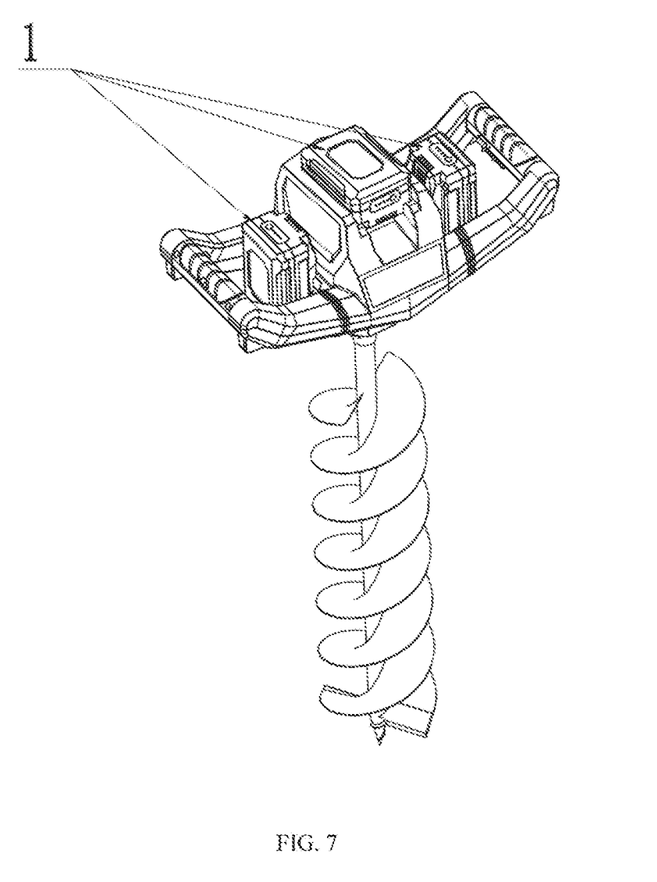
FIG. 7 is a perspective view of the lightweight electric earth drill (provided with three batteries) according to the embodiment.

As shown in FIG. 7, three rechargeable batteries 1 are provided, and the three rechargeable batteries 3 are mounted on the top, the left and right sides of the outer shell 2.

Preferably, the outer shell 2 is provided with a power interface 12 connected to an external power supply. The power interface 12 is electrically connected to the controller 3 to power the motor 4 and charge the rechargeable battery 1. If there is mains electricity, then it can be used to power the motor 4 and charge the rechargeable battery 1. If there is no mains electricity, then the rechargeable battery 1 can be used to supply power.

Preferably, a lamp 13 is electrically provided below the lower shell 22 and connected to the controller 3, and the lamp illuminates along a direction of the drill stem, which is convenient to operate at night or in a dark environment.

Preferably, one end of the drill stem 6 is engaged with an output shaft 41 of the motor 4, and a pin 9 is inserted at a position where the drill stem 6 is engaged with the output shaft 41. The drill stem 6 is provided with double blades 62 that continuously spiral up from a drill bit 61.

Preferably, the drill bit 61 with a conical shape is sheathed on the earth-drilling end of the drill stem 6. A tip end of the drill bit 61 is provided with a thread 611, and the end of the drill bit 61 opposite to the tip end is provided with a cutting blade 612 abutting against the double blades 62. The cutting blade 612 is preferably of a tungsten steel material. The thread 611 drills a small hole in the earth, then the cutting blade 612 made by tungsten steel contacts with the earth's surface to drill hole as the depth deepens. The cutting blade 612 made by tungsten steel works better especially in the case of the hard rock soil and the powdered rock geology. At the same time, the drill bit 61 can be replaced anytime and anywhere according to different geological conditions and wear condition.

Preferably, a center hole 10 for water passing is provided at the centers of the output shaft 41 and the drill stem 6, and the outer shell 2 is provided with a water inlet 14. A side hole 11 is provided at the end of the drill stem 6 close to the drill bit 61. The side hole 11 communicates with the center hole 10. When the geology is relatively hard, the power of the motor 4 limits the rotation of the drill stem 6 and the drill bit 61, resulting in the difficulty of drilling quickly. What's more, the drill bit 61 is severely heated. At this moment, the end of the output shaft 41 may be sheathed on the external high-pressure water source through the water inlet 14. After the water is passed, the temperature of the drill bit 61 is lowered, and the rock soil is dissolved and softened, thereby speeding up the drilling and reducing the wear of the drill bit 61.

Figure 4:
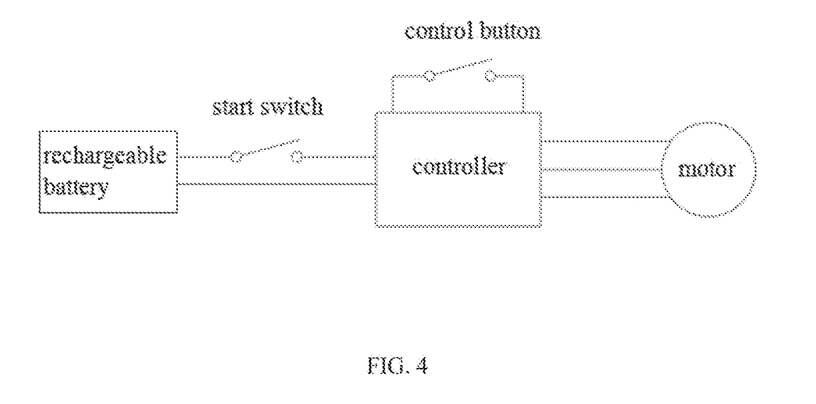
FIG. 4 is a schematic diagram showing a system principle of the lightweight electric earth drill according to the embodiment.

As shown in FIG. 4, the system principle of the lightweight electric earth drill is as follows: the controller 3 is electrically connected to the rechargeable battery 1 and the motor 4, and a start switch 8 is further provided between the rechargeable battery 1 and the controller 3, and the controller 3 is electrically connected to the control button 71. During operation, the start switch 8 is turned on, then the controller 3 is powered on, and the control button 71 is started to power the motor 4, thus, the forward/reverse rotation and the rotation speed of the motor 4 are controlled according to different gears of the control button 71.

With or without replacing the drill stem 6, the present invention can be used for drilling ice and walls, screwing and the like.

The above embodiments are only the preferred embodiments of, but not intended to limit, the present invention. Therefore, any modifications, equivalent replacements and improvements made within the spirit of the present invention should fall in the scope of the present invention.

What is claimed is:

1. A lightweight electric earth drill, comprising:
   a mounting plate,
   a drill stem,
   an outer shell,
   a motor installed on the mounting plate and configured to drive the drill stem to rotate,
   a rechargeable battery configured to power the motor, and
   a controller configured to control the motor and electrically connected to the motor and the rechargeable battery;

wherein a lamp is electrically provided below the outer shell and connected to the controller; and the lamp illuminates along a direction of the drill stem, wherein the drill stem is provided with double blades that continuously spiral up from a drill bit provided at an earth-drilling end of the drill stem; a tip end of the drill bit is provided with a thread; and an end of the drill bit opposite to the tip end is provided with a cutting blade abutting against the double blades.

2. The lightweight electric earth drill according to claim 1, wherein the rechargeable battery is a lithium battery that is fixedly and detachably mounted on a top, or a left side or a right side of the outer shell; or two rechargeable batteries are provided; and the two rechargeable batteries are detachably mounted on the left and the right sides of the outer shell, or detachably mounted on the top and the right side of the outer shell, or detachably mounted on the top and the left side of the outer shell; or three rechargeable batteries are provided; and the three rechargeable batteries are mounted on the top, the left and right sides of the outer shell.

3. The lightweight electric earth drill according to claim 1, wherein the outer shell is provided with a power interface connected to an external power supply; the power interface is electrically connected to the controller to power the motor and charge the rechargeable battery.

4. The lightweight electric earth drill according to claim 1, wherein the lightweight electric earth drill on both sides is provided with a handle, and the handle is fastened to the mounting plate.

5. The lightweight electric earth drill according to claim 4, wherein the handle is provided with a control button electrically connected to the controller; and the control button controls on/off and forward/reverse rotation of the motor.

6. The lightweight electric earth drill according to claim 1, wherein one end of the drill stem is engaged with an output shaft of the motor; and a pin is inserted at a position where the drill stem is engaged with the output shaft.

7. The lightweight electric earth drill according to claim 6, wherein a center hole for water passing is provided at centers of the output shaft and the drill stem; a side hole is provided at the end of the drill stem close to the drill bit; and the side hole communicates with the center hole.

\* \* \* \* \*